(12) United States Patent
Swahn et al.

(10) Patent No.: US 7,086,801 B2
(45) Date of Patent: Aug. 8, 2006

(54) COULING ARRANGEMENT

(75) Inventors: Martin Swahn, Hälsö (SE); Tom Stoddart, Gothenburg (SE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/808,646

(22) Filed: Mar. 25, 2004

(65) Prior Publication Data

US 2004/0190982 A1 Sep. 30, 2004

(30) Foreign Application Priority Data

Mar. 25, 2003 (EP) .................................. 03006631

(51) Int. Cl.
*F16B 7/18* (2006.01)

(52) U.S. Cl. .......................... 403/118; 403/43; 403/45; 403/48; 403/342

(58) Field of Classification Search ............ 403/43–45, 403/48, 118, 342, 343; 296/193.02, 72
See application file for complete search history.

(56) References Cited

U.S. PATENT DOCUMENTS 5,492,388 A 2/1996 Kawasaki 5,702,196 A * 12/1997 Petercsak .................... 403/46
5,906,450 A * 5/1999 Ng ............................ 403/46
6,431,602 B1 8/2002 Ralko et al.

FOREIGN PATENT DOCUMENTS

DE 9217488 2/1993

* cited by examiner

*Primary Examiner*—Daniel P. Stodola
*Assistant Examiner*—Michael P. Ferguson
(74) *Attorney, Agent, or Firm*—Gigette M. Bejin

(57) ABSTRACT

A coupling arrangement for enabling fixing of a body structure member and a structure member. The coupling arrangement includes, at least two threaded tubes provided one in either end portion of a passage through a housing. The housing is fixed attachable in relation to the structure members and includes a threaded passage, wherein a threaded bolt is arranged through the passage. The threaded bolt is adapted to connect the body structure member and the structure member in a coupling position, from which coupling position the threaded bolt, via inserts, enables adjusting operation of the threaded tubes in opposite directions along the threaded bolt. Thus, the threaded tubes are adjustable to a respective fixed position by screwing the threaded bolt.

6 Claims, 5 Drawing Sheets

COULING ARRANGEMENT

RELATED APPLICATION

This application claims priority from European Patent Application No. 03006631.0, filed Mar. 25, 2003.

FIELD OF THE INVENTION

The invention relates to a coupling arrangement for enabling fixing of a structure member and a body structure. Furthermore the invention relates to a vehicle provided with such a coupling arrangement.

TECHNICAL BACKGROUND

Connecting devices for lateral fixing of structure members are well known in the art and there also exist a number of alternative attaching devices for providing a robust connection between various structure members in the art. Such connecting and attaching devices are preferably designed with high accuracy for providing optimum support. In series production, such as production of vehicles, it is common to use pre-fabricated standardized connecting devices and structure members.

Still, during production even when using such standardized products there is often an issue with tolerance deviation. This deviation may have many reasons, such as variations in quality, different working methods etc. When two structure side elements are mutually connected at a fixed lateral distance and the connecting element is either too long or too short this might lead to added strain in some zones of the side element when being connected. Added strain and stress in such zones might reduce the fatigue life, the shock impact resistance etc. of the resulting structure.

Vehicle body structures is one example where it is of great importance to reduce stress and tension in the structure due to reasons of safety and quality etc.

U.S. Pat. No. 5,492,388 presents a structure with a coupling arrangement intended for vehicles and which structure includes left and right side members such as left and right front pillars, and a cross member, such as a steering member, which extends laterally between the side members, and which has left and right ends, respectively, fastened to the left and right side members. The structure further includes an adjusting screw member which is mounted on one end of the cross member for adjusting the total length of the cross member so as to fit between the left and right side members. The adjusting operation is done by rotating the adjusting screw member in an unscrewing direction to increase the length until the screw member abuts on the adjacent side member, and the adjustable end of the cross member is fastened to this side member by a screw fastener. The adjusting screw member is formed with an engagement hole or socket for receiving a tool used for torquing the screw member.

Such prior art devices are currently used for correcting tolerance deviations and are often difficult to handle since they need to be manipulated on either side of a side member at the same time for securing the cross member to said side member. In today's compact vehicle design there is a strong need for an easier manner of performing fixing of two structure members at a given distance by a cross member or the like. It is also desirable to reduce any induced stress in the structure from such operation. This is especially an issue for body structure members having sidewalls and a hollow interior, such as an A-, B-pillar in a vehicle. Such structures are sensitive to induced stress and also quite often there is an issue with tolerance deviations that would add to the risk of inducing more stress instead of reducing stress.

SUMMARY OF THE INVENTION

The object of the present invention is to provide a coupling arrangement that overcomes the above issues, and presents a fixing of structure members with a high degree of support and at the same time being able to cope with tolerance deviations.

A further object of the present invention is to provide a safe, robust and reliable coupling arrangement which can be installed easily with a minimum of uncomfortable working positions for a mechanic having to deal with the connection of such structure members.

These and other objects are achieved by a coupling arrangement according to claim 1. Preferred embodiments of the invention are defined in the dependent claims.

According to the invention there is provided a coupling arrangement for enabling fixing of a body structure member and a structure member. Said coupling arrangement comprises, at least two threaded tubes provided one in either end portion of a passage through a housing, said housing being attachable fixed in relation to said structure members and having a threaded passage, wherein a threaded bolt is arranged through said passage, said threaded bolt is adapted to connect said body structure member and said structure member in a coupling position, from which coupling position said threaded bolt, via inserts, enables adjusting operation of said threaded tubes in opposite directions along said threaded bolt, so that said threaded tubes are adjustable to a respective fixed position by screwing the threaded bolt (10).

Hence, by using the inventive coupling arrangement it is possible to provide support to the connected structure in a flexible manner as regards variations in distance between members to be coupled and at the same time reduce impact from tolerance deviations within a hollow body structure member forming part in the coupling arrangement. A solid reinforcement inside the hollow body structure will be formed together with an adaptable support between two structure members which are to be interconnected.

More, specifically, one of said threaded tubes is arranged left-hand threaded in a first associated end portion of the housing and another of said threaded tubes is arranged right-hand threaded in a second associated end portion of the housing.

Advantageously, the fixing of said coupling arrangement is enabled by operation of one threaded bolt which is accessible from the outside of said body structure member relative to the coupling arrangement. It can thus be installed with a minimum of uncomfortable working positions for a mechanic having to deal with the connection of such structure members.

Preferably, one of said threaded tubes is a body tensioning tube working together with said housing to form a supporting structure for the interior of the body structure in a fixed position.

More preferably, the objects of the present invention is achieved by letting one of said threaded tubes in a preferred embodiment of the invention be a tolerance absorbing tube capable of forming a supporting structure between said structure members.

According to a preferred embodiment of the invention said threaded tubes are at least partially threaded on portions of the outer sidewall and the housing is complementary threaded on portions of its inner sidewall.

Preferably, the threaded tubes may be adjusted to a desired position independently of one another according to a preferred embodiment of the invention. The threaded bolt is arranged to slide against an insert of a corresponding threaded tube when said threaded tube having reached a hard stop. The hard stop is preferably a predetermined threshold value, for which the coupling arrangement is designed. Hence the risk for inducing excessive stress or strain to the coupling arrangement is reduced by using this principle for the inserts in combination with the inventive coupling arrangement.

Advantageously, each end portion of an elongated structure element is provided with a coupling arrangement in accordance with the invention. This is particularly suitable when the elongated structure element is to be positioned symmetrically between two structure side members.

Although suitable for a number of installations the coupling arrangement is preferably intended for enabling fixing of two structure members of a vehicle body. Especially, the coupling arrangement is suitable for interconnecting one instrument panel structure and one A-pillar section.

BRIEF DESCRIPTION OF THE DRAWINGS

A currently preferred embodiment of the present invention will now be described in more detail, with reference to the accompanying drawings.

DETAILED DESCRIPTION OF PREFERRED EMBODIMENTS

A first embodiment of the invention related to a coupling arrangement will be described in more detail in the following with reference to the accompanying drawings.

Figure 1:
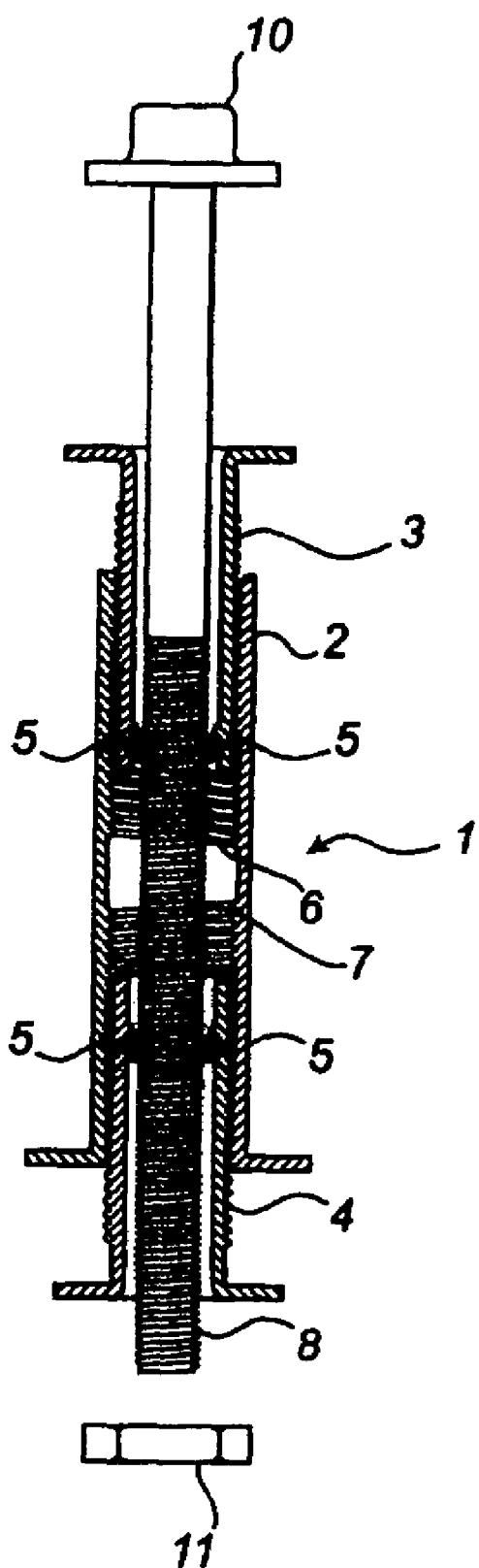
FIG. 1 is a cross section of a coupling arrangement according to an embodiment of the invention.
Figure 2A:
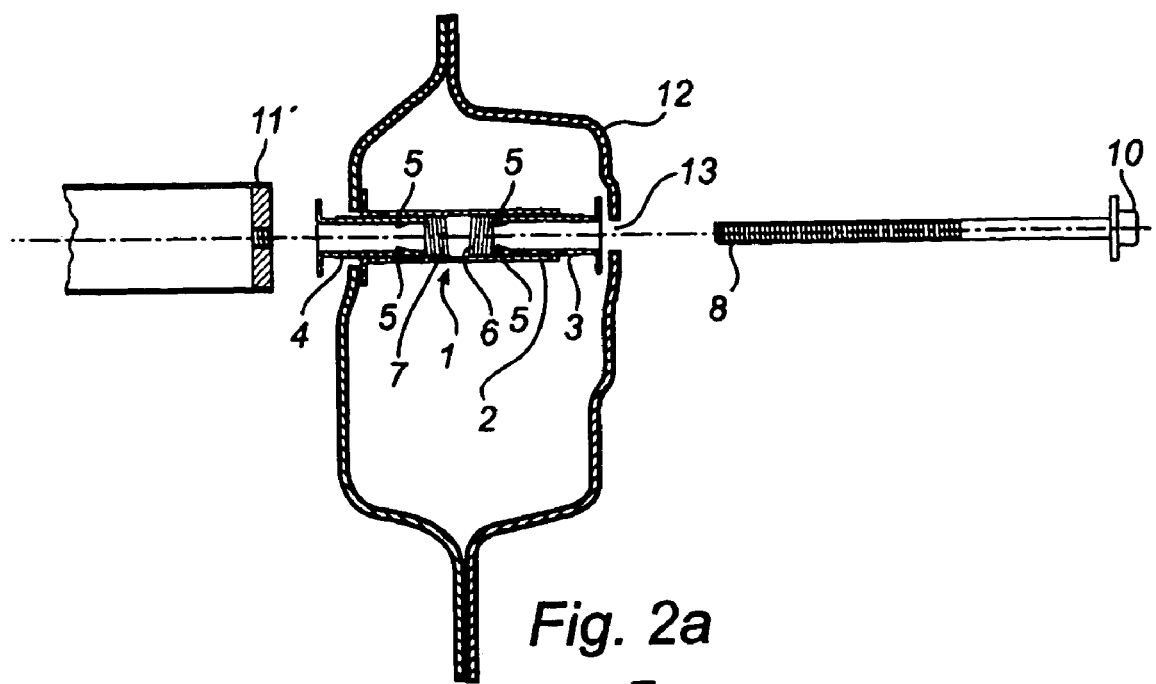
FIG. 2a is a partial cross sectional side view of a preferred embodiment of the coupling arrangement in an initial condition.
Figure 2B:
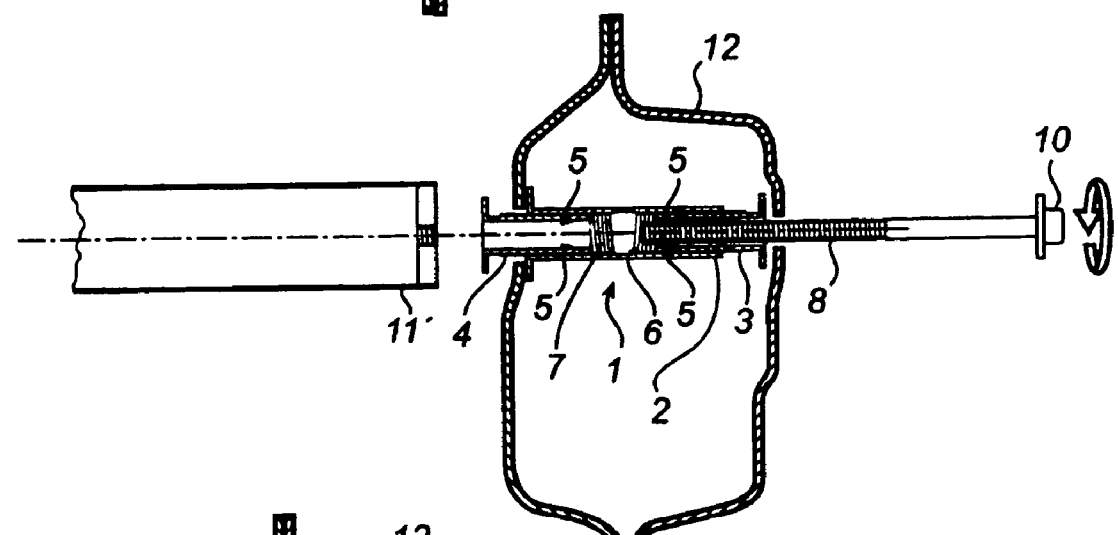
FIG. 2b is a partial cross sectional side view of a preferred embodiment of the coupling arrangement during a coupling position.
Figure 2C:
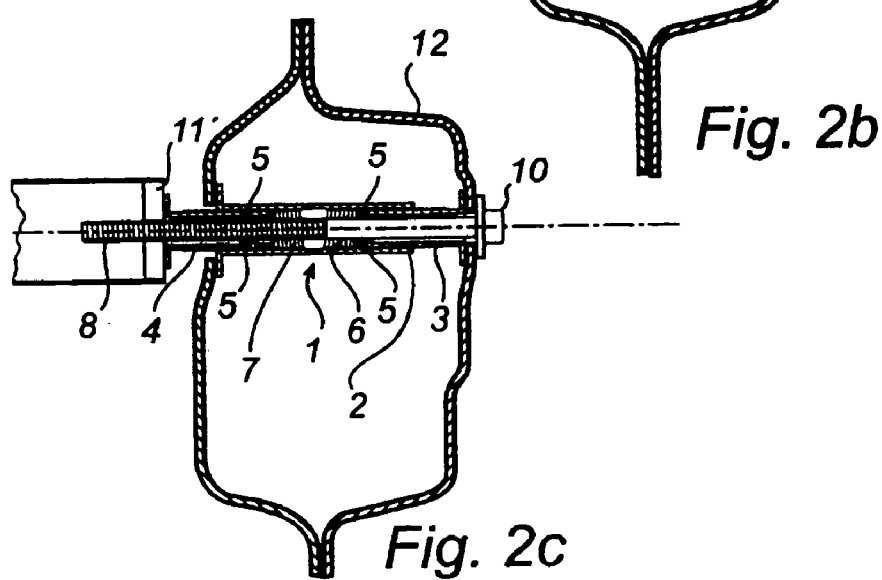
FIG. 2c is a partial cross sectional side view of a preferred embodiment of the coupling arrangement when in a fixed position.
Figure 3:
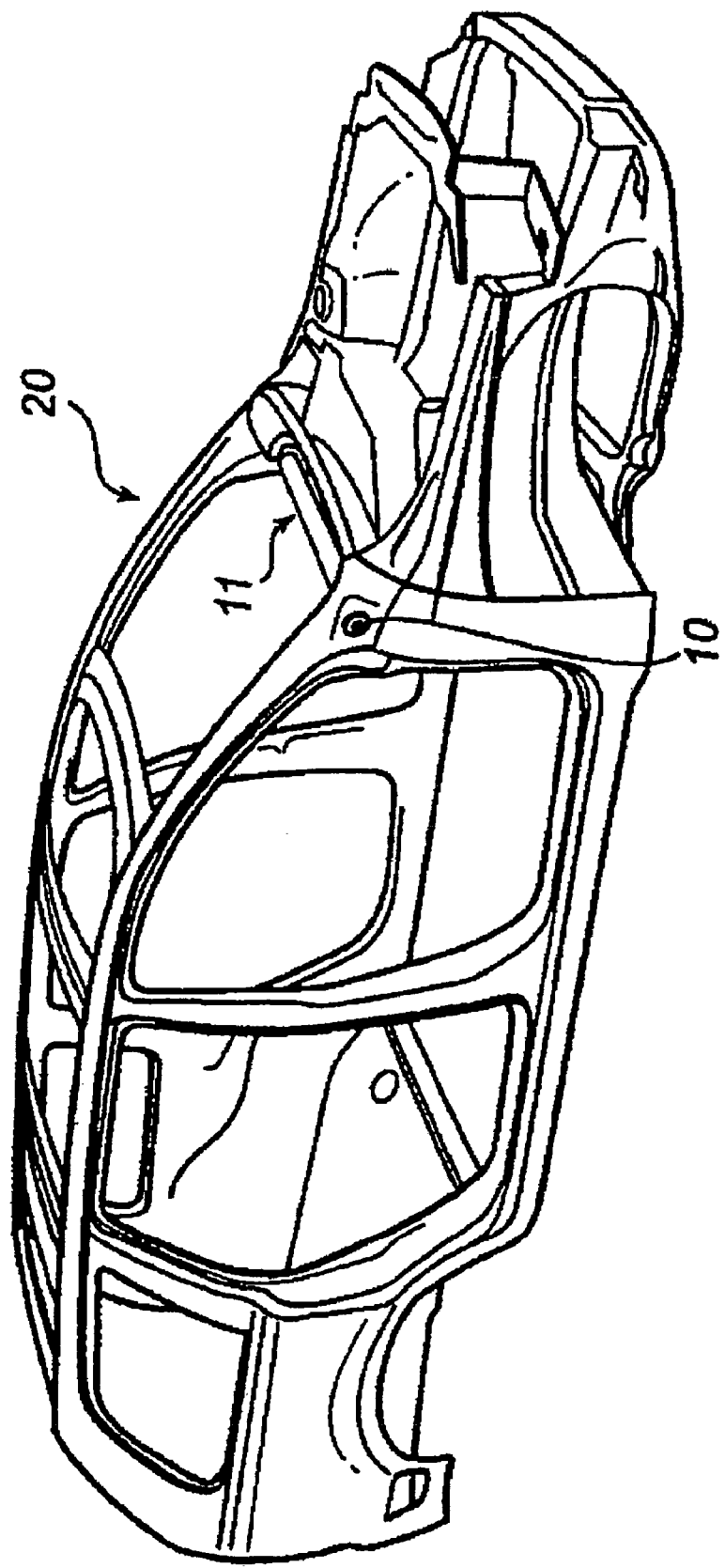
FIG. 3 is a perspective view of a vehicle structure provided with a coupling arrangement according to the present invention.
Figure 4:
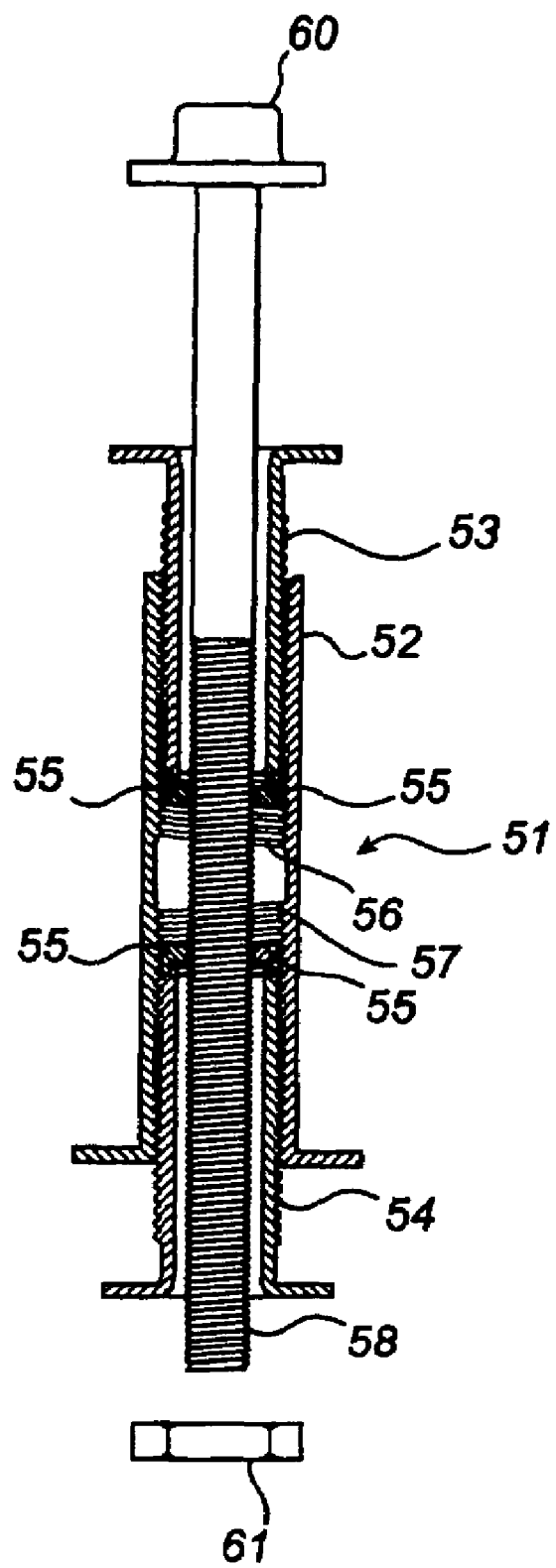
Figure 5:
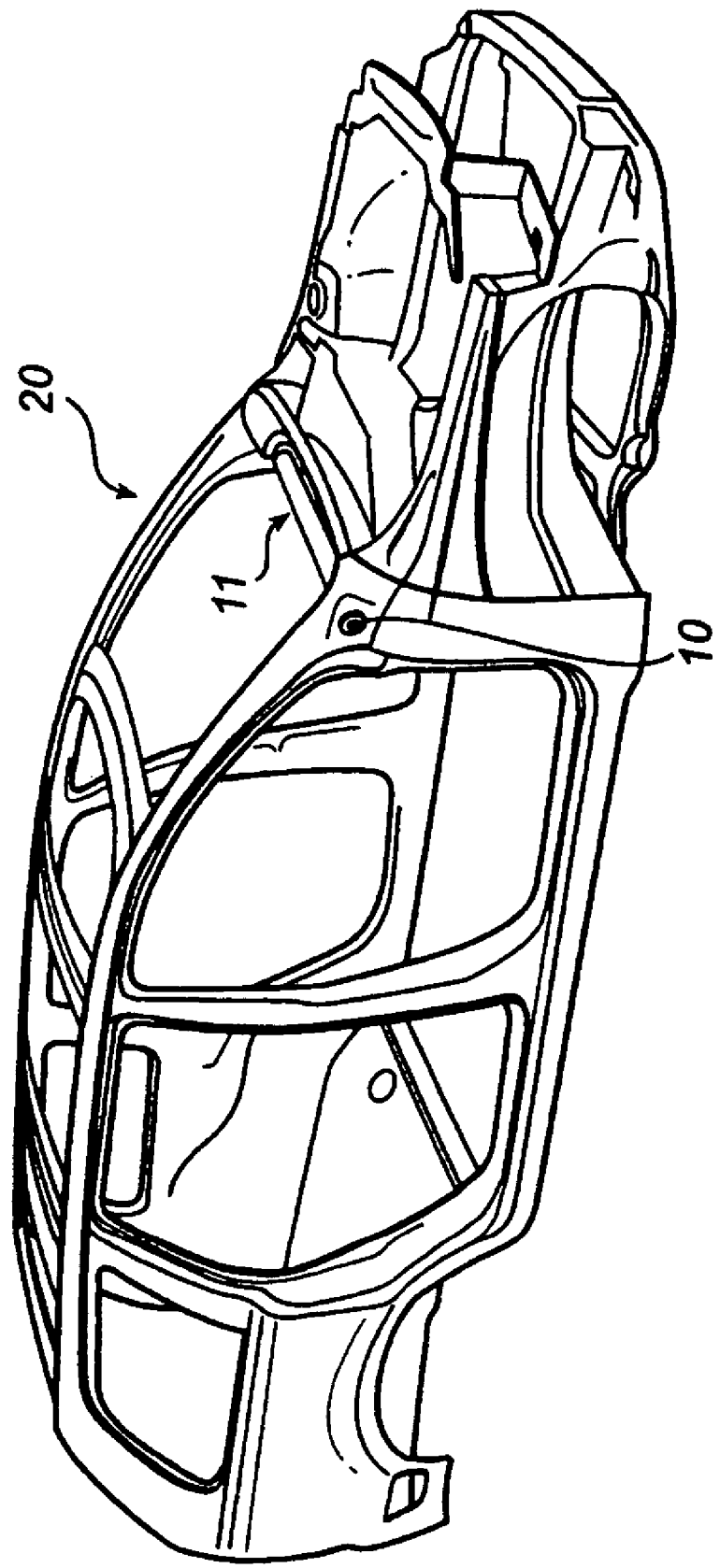

Referring now to FIGS. 1–3, a coupling arrangement 1 is to be introduced into one structure member 11. The structure member 11 is preferably a beam, a profile or a steering member. Furthermore, the structure member 11 has at least one end portion with a receiving opening. A coupling arrangement 1 is designed for being at least partially introduced into said receiving opening. The coupling arrangement 1 is adapted for fitting in an adjustable manner to said structure member 11. The coupling arrangement 1 is adjustable by an engaging screw joint. Furthermore, the coupling arrangement 1 is provided with a passage 13. The screw joint comprises a threaded bolt 10. The threaded bolt 10 is arranged from the opposite side of one of the structure side members 12, through a passage 13 and for extending into said passage 13 and further for engagement with said structure member 11. According to a preferred embodiment the bolt 10 is right hand threaded.

Two threaded tubes 3, 4 are provided one in either end portion of said passage 13. The passage runs through a housing 2 of the coupling arrangement. According to a preferred embodiment said housing is fixed positioned in relation to said structure members. Preferably, the housing 2 of the coupling arrangement 1 is secured to one structure member by welding. Other alternatives known in the art, such as bolts, pins, screws, etc, may be used for securing the housing fixed to a structure member without departing from the scope of protection. The threaded bolt 10 is adapted to connect said body structure member 12 and said structure member 11; 11' in a coupling position. In this coupling position said threaded bolt 10, via inserts 5, enables adjusting operations of said threaded tubes 3, 4 in opposite directions along said threaded bolt 10. According to a preferred embodiment this is accomplished in that one threaded tube 3 will turn inside the threaded housing on a left-hand thread in a first associated end portion of the housing 2. A second threaded tube 4 is arranged to turn inside the threaded housing 2 on a right-hand thread in a second end portion of the housing 2. The threaded tubes 3, 4 are provided with inserts 5 for gripping onto the threaded bolt 10. Thus, the threaded tubes 3, 4 are forced to move in opposite directions in relation to said fixed housing 2 when turning the threaded bolt 10.

Referring now to FIGS. 2a–2c the function of a preferred embodiment of the coupling arrangement 1 will be described. In FIG. 2a the coupling arrangement 1 has been introduced to a body structure member 12. The housing 2 is attached to one inner side of the body structure 12. A profile 11', having a receiving opening, is to be attached to the body structure member 12. The threaded housing 2 is provided with a threaded tube 3, 4 in its end portions. When the threaded bolt 10 is introduced through the body structure member 12 and consequently in the passage of the coupling arrangement the inserts 5 of the first threaded tube 3 will grip onto the threaded bolt 10.

As will be apparent in FIG. 2b the grip onto the threaded bolt 10, via the insert, 5 causes the first threaded tube 3 to turn when the threaded bolt 10 is turned. The housing 2 is provided with a left-hand thread in a portion where the first threaded tube 3 is located. The left-hand thread portion of the housing 2 causes the first threaded tube 3 to move along the housing in an opposite direction in relation to the threaded bolt 10 when further introduced to the coupling arrangement 1. The first threaded tube 3 will move until it reaches an inner wall portion of the body structure member, hence accomplishing a "solid tube" together with the threaded housing 2 inside the body structure member 12. Preferably, the first threaded tube 3 is provided with flanges, or the like, in the end portion which is to be in contact with the inner wall portion of the body structure member for providing added support. The "solid tube" will provide stability and support to the body structure 12 in a zone where the structure member 11' is to be attached.

At this point a threshold value for the friction, between the inserts of the first threaded tube 3 and the bolt, will be overcome and the bolt will continue further in the passage. The threaded bolt 10 will then continue and grip onto an insert within a second threaded tube 4. The threaded bolt 10, via the insert 5, causes the second threaded tube 4 to turn when the threaded bolt 10 is turned. The housing 2 is provided with a right-hand thread in a portion where the second threaded tube 4 is located. The right-hand thread portion of the housing 2 causes the second threaded tube 4 to move along the threaded bolt 10, when the threaded bolt 10 is further introduced into the coupling arrangement 1. The end portion of the threaded bolt 10 will reach the structure member 11' and be further introduced into a receiving opening thereof. As the threaded bolt is turned further the second threaded tube 4 will turn inside the threaded housing on a right-hand thread until it contacts an end portion of the structure member 11'. Thus, a solid attachment, capable of eating any tolerance between the body structure member 12 and the structure member 11', is created.

Preferably, the second threaded tube 4 is provided with flanges, or the like, in the end portion which is to be in contact with the end portion of the structure member 11' for providing added support.

Furthermore, it is realized that the fixing and tolerance compensation of said coupling arrangement 1 is enabled by operation of one screw joint which is accessible from the outside of said structure member 12 relative to the coupling arrangement 1.

In FIG. 3 a coupling arrangement us used for securing an IP-panel 11 to a set of A-pillars of a vehicle 20. This is an example illustrating that a compact and integrated design may be accomplished by the coupling arrangement 1. Furthermore, the A-pillars are subject to high demands with respect to safety, impact, stress and at the same time they are to be used in a flexible manner during manufacturing of a vehicle. Hence, the function of the coupling arrangement, which provides support to the body structure and tolerance absorption to a second connecting structure member, are well suited for use in this particular case. Still there are many other areas of use for this invention, especially within the vehicle industry.

Although the present invention has been described in connection with particular embodiments thereof, it is to be understood that various modifications, alterations and adaptations may be made by those skilled in the art without departing from the spirit and scope of the invention. Hence it is realized that the coupling arrangement 1 can be used together with structure side members 12 that are designed in various ways without departing from the scope of the invention. The coupling arrangement 1 according to the invention is not limited to the use of a specific material. The support flanges of the tubes 3, 4 and the housing 2 of the coupling arrangement 1 can be altered in order to secure optimum load transformation and performance of the coupling arrangement 1.

Furthermore, the construction of the threaded housing can be altered in order to allow fixed attachment on the outside of a body structure member (not shown). The support flanges of the threaded housing is then adapted to rest against the outside of the body structure member to which it is to be fixed attached. The threaded housing, according to this alternative embodiment of the invention, is at least partly introduced to the inner body structure. It is realized from the above mentioned that the support flanges, or the like, are not necessarily provided by the end portions of the threaded housing, but can rather be placed somewhere along the threaded housing as long as it allows for a fixed attachment to the body structure member. Also other conventional means and methods, known in the art, for providing a secure attachment between the threaded housing and the body structure member 12 are available without departing from the claimed invention.

Finally, it is realized that the coupling arrangement is suitable for a number of connections where "tolerance eating" and solid attachment are of interest and hence the claimed invention is not limited to the preferred embodiment which is given as an example. Hence, it is suitable to use the coupling arrangement for e.g. connecting motor parts, installations and other equipment to a body structure member. Specifically, but not exclusively the coupling arrangement is conveniently used in vehicle manufacturing.

What is claimed is:

1. A vehicle body having a coupling arrangement wherein the coupling arrangement includes at least two externally threaded tubes, one of said externally threaded tubes provided in a first end portion of an internally threaded passage through a housing and threadedly engaged with said internally threaded passage, and another one of said externally threaded tubes provided in a second opposite end portion of said internally threaded passage and threadedly engaged with said internally threaded passage, the housing being fixed attachable in relation to a body structure member and a structure member, wherein a threaded bolt is arranged through said internally threaded passage and the threaded bolt is adapted to connect said body structure member to the structure member in a coupling position, from which coupling position said threaded bolt, via inserts provided in said externally threaded tubes, enables adjusting operations of the threaded tubes in opposite directions along said threaded bolt, so that the threaded tubes are adjustable to a respective fixed position by turning the threaded bolt, the vehicle body comprising: said coupling arrangement interconnecting an instrument panel structure and an A-pillar section, wherein the instrument panel structure is the structure member and the A-pillar section is the body structure member.

2. The vehicle body of claim 1, wherein the one of said threaded tubes is arranged left-hand threaded in the first end portion of the housing and the another one of said threaded tubes is arranged right-hand threaded in the second opposite end portion of the housing.

3. The vehicle body of claim 1, wherein the fixing of said coupling arrangement is enabled by operation of one threaded bolt which is accessible from the outside of said body structure member relative to the coupling arrangement.

4. The vehicle body of claim 1, wherein one of said threaded tubes is a body tensioning tube forming a supporting structure with said housing for the interior of the body structure in a fixed position.

5. The vehicle body of claim 1, wherein one of said threaded tubes is a tolerance absorbing tube capable of forming a supporting structure between said coupled structure members.

6. The vehicle body of claim 1, wherein said threaded bolt is arranged to slide against an insert of a corresponding threaded tube when said threaded rube having reached a hard stop.

\* \* \* \* \*